United States Patent [19]

Edwards

[11] 4,236,659
[45] Dec. 2, 1980

[54] TRANSPORT MECHANISM FOR STATIONARY ENCODERS

[75] Inventor: Richard A. Edwards, Alameda, Calif.

[73] Assignee: Esselte Pendaflex Corporation, Garden City, N.Y.

[21] Appl. No.: 35,794

[22] Filed: May 3, 1979

[51] Int. Cl.³ ............................................. G03B 1/22
[52] U.S. Cl. ...................................... 226/58; 226/62; 226/67
[58] Field of Search ...................... 226/52, 62, 63, 64, 226/67, 54, 55, 58, 73, 87, 81; 352/191, 194, 197

[56] References Cited

U.S. PATENT DOCUMENTS

| | | | |
|---|---|---|---|
| 1,560,908 | 11/1925 | Garbutt | 226/62 |
| 2,633,056 | 3/1953 | Lang | 226/87 |
| 3,587,960 | 6/1971 | Gerb | 226/62 |
| 4,017,167 | 4/1977 | Mitchell | 352/194 |
| 4,022,365 | 5/1977 | Weller | 226/81 |

Primary Examiner—Edward J. McCarthy
Attorney, Agent, or Firm—Gerald J. Ferguson, Jr.; Joseph J. Baker

[57] ABSTRACT

A mechanism is disclosed for feeding tag stock having spaced-apart drive holes and comprises a pair of slidably mounted carrier arms beneath the tag stock each having a plurality of spring loaded pins on an end thereof. The pins of each carrier arm are alternately brought into engagement with the tag stock by means of a rotating cam which engages a follower on the carrier arm. A pin in each of the carrier arms will alternately engage a hole in the tag stock in registry therewith to sequentially advance the tag stock a desired increment of distance as the cam continues to rotate.

7 Claims, 7 Drawing Figures

U.S. Patent  Dec. 2, 1980  Sheet 1 of 2  4,236,659
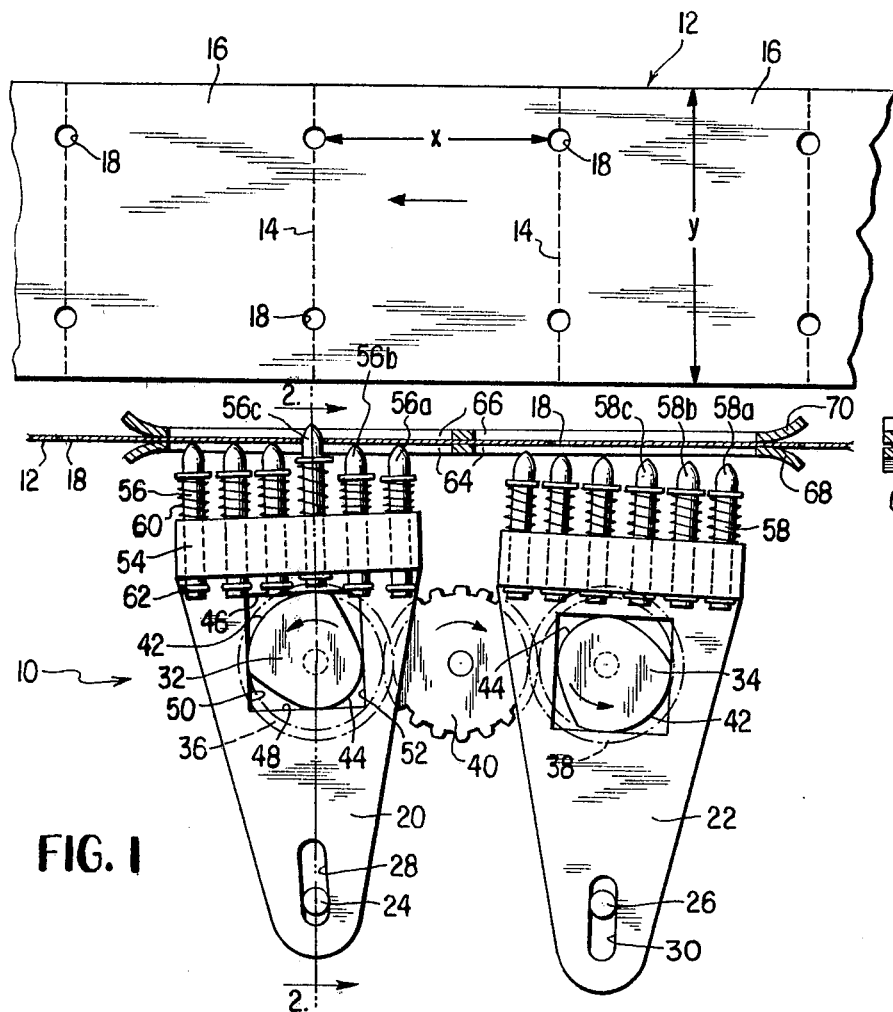

TRANSPORT MECHANISM FOR STATIONARY ENCODERS

SUMMARY OF THE INVENTION

This invention relates to transport mechanisms and more specifically to a device for feeding a string of tags perforated in various lengths and widths. The tags generally have two spaced-apart holes at the perforation and must be fed in predetermined increments at a specific speed. To move the tags, a pair of carrier arms are provided mounted for oscillatory swinging and reciprocating movement beneath the supported string of tags. The arms each have a set of slidably mounted pins urged by springs into engagement with the tag stock. Individual cams connected in tandem are driven at the same speed and each engage a respective cam follower on the carrier arms. As the cams rotate, each of the sets of pins is alternately brought into contact with the tag stock whereupon one pin in each set will alternately engage a hole in registry therewith to sequentially advance the tag stocka desired increment of distance. Thus, there is a pin of one of the sets in engagement with a hole in the tag stock at all times.

Devices of the prior art for feeding strip material by reciprocating, cam driven carrier arms are often associated with machines for projecting motion picture film. An example being that disclosed in the patent to Mitchell, U.S. Pat. No. 4,017,167 which utilizes a single claw brought into and out of engagement with the perforations in the film by means of a single carrier arm whose reciprocating motion is caused by one cam and whose oscillatory motion is caused by a second cam. The webbed material in the devices of the prior art is permitted to "float" prior to being re-engaged by the claw which often results in slight slippage of the material and subsequent damage due to misalignment of the claw and the next drive hole. No mechanism was found in the prior art for sequentially advancing tag stock or other web material perforated in a wide range of lengths a predetermined increment of distance while at the same time having a part of the mechanism in driving engagement with a perforation in the material at all times.

Accordingly, it is an important object of the present invention to provide a device capable of sequentially advancing web material perforated in a wide vatiety of widths.

It is another important object of the present invention to provide a transport mechanism for web material wherein the material is under the control of the mechanism at all times and not permitted to "float".

It is another important object of the present invention to provide a mechanism for transporting web material with constant acceleration and deceleration during each increment of movement.

It is another important object of the present invention to provide a transport mechanism which is quiet and efficient in its operation and which, due to its simple construction, is substantially trouble-free.

These and other objects and advantages of the invention will become apparent upon reference to the following specification, attendant claims and drawings.

BRIEF DESCRIPTION OF THE DRAWINGS

FIG. 1 is a side elevational view of the transport mechanism of the present invention.

FIG. 2 is a cross-sectional view of the transport mechanism of FIG. 1 taken along the lines 2—2 of FIG. 1.

FIGS. 3a–3e are schematic illustrations of one complete sequence of operation of the transport mechanism.

DETAILED DESCRIPTION OF THE PREFERRED EMBODIMENT

Figure 3B:
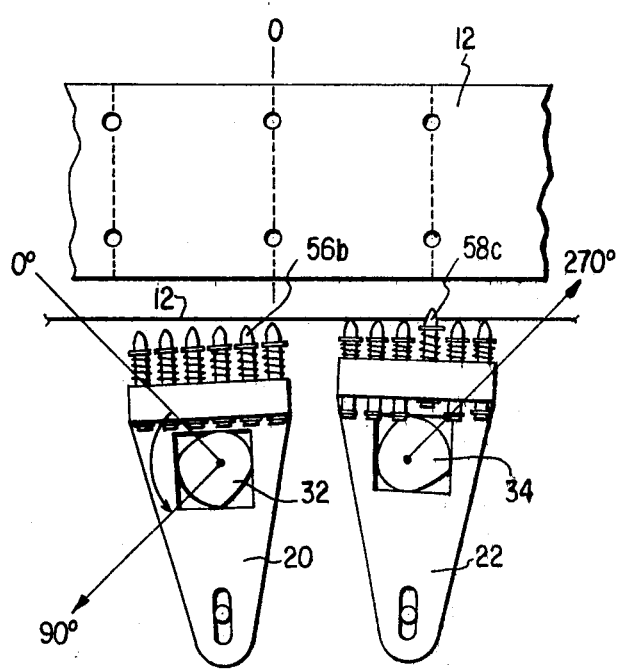

Referring now to the drawings where like characters of reference indicate like parts in each of the several views, FIGS. 1 and 2 depict the transport mechanism 10 capable of feeding a string of tag stock or other webbed material 12 usually of paper construction. The transport mechanism 10 is typically associated with a stationary encoder wherein the tag stock 12 is advanced in increments in the direction of the arrow, for example, seven millimeters of distance or one line of printed information. The tag stock 12 has perforations 14 extending transverse thereof, which divide the stock into individual tags 16. The perforations 14 can be of various lengths (x), such as for example, 14, 21, 28, 35 or 42 millimeters and of widths (y) of, for example, 36, 50 or 60 millimeters. The tags 16 have two holes 18 at the perforation 14 which serve as the drive holes for the transport mechanism 10 to be presently described.

The transport mechanism 10 consists of a first carrier arm 20 and a second carrier arm 22 each slidably mounted on pivot pins 24, 26, respectively, located in the same horizontal plane. The pivot pins 24, 26 are positioned in slots 28, 30, respectively, in the carrier arms and permit the carrier arms oscillatory swinging and reciprocating movement. Such movement is provided by cams 32, 34 which are fixed to gears 36 and 38 respectively. The gears 36, 38 are in mesh with drive gear 40 which rotates both gears 36, 38 and their associated cams 32, 34 in the same counterclockwise direction and at the same speed. The cams 32 and 34 are positioned in opposite phase relation to each other, i.e. cam 32 is 180 degrees out of phase with cam 34. The cams 32, 34 are of the self-conjugate type and are identical in size, form and in the throw they produce. Each cam 32, 34 has two opposite dwell surfaces 42, 44 which are concentric at the cam axis and have larger and smaller radii respectively.

The cams 32,34 work between two parallel and substantially horizontally opposed cam follower surfaces 46, 48 which control the carrier arms reciprocating or longitudinal translational movement and two cam follower surfaces 50, 52 which are also parallel to each other and to the longitudinal axis or vertical position of the respective carrier arms. The cam follower surfaces 50, 52 control the oscillatory swinging movement of the carrier arms 20, 22. Follower surfaces 46, 48 and 50, 52 typically comprise opposite sides of a square aperture or box formed in each carrier arm 20, 22.

At the end of each of the carrier arms 20, 22 is a head 54 in which a plurality of pins 56, 58 are slidably mounted in holes. The ends of the pins 56, 58 are bullet-nosed, a shape which facilitates its entry into the drive holes 18. The pins 56, 58 are urged upward by means of springs 60 and are held in place by means of "E"-shaped rings 62. The tip of the pins 56, 58 of respective carrier arms 20, 22 is twice the distance from the respective pivot point 24, 26 as the leading edge of the dwell surface 42 is from the respective pivot point. The substantially triangular shape of the cams 32, 34 rotating in the square hole formed by the cam follower surfaces 46, 48, 50, 52 make the tip of each bullet-nosed pin 56, 58 describe essentially a rectangular path. Thus, for example, at the aforementioned 2 to 1 ratio point, the dwell surface 42 of cams 32, 34 at its maximum height or radius is 3.5 millimeters higher than at its lowest point which is the radius of dwell surface 44. This causes the tips of the pins to travel 3.5 millimeters vertically and the desired 7 millimeters horizontally.

As can be seen in FIG. 1, the pin 56c is engaged in a drive hole 18 in the tag stock 12. The pins 56, 58 are guided laterally by slots 64, 66, respectively, in guides 68, 70 between which the tag stock 12 is fed. The other pins 56 are depressed against the pressure of their individual springs 60 by the lack of drive holes in the tag stock 12 at these locations. Carrier arm 22 and its cooperating pins 58 are in their lowered position out of contact with the tag stock 12 due to the position of cam 34 being 180 degrees out of phase with cam 32.

Figure 3C:
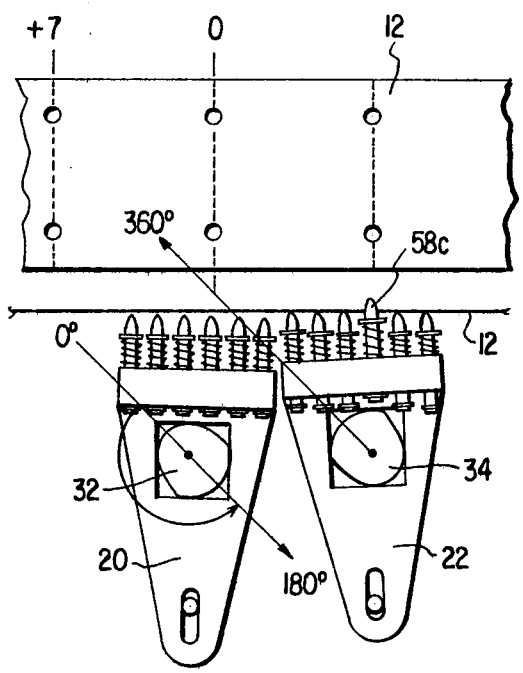
Figure 3D:
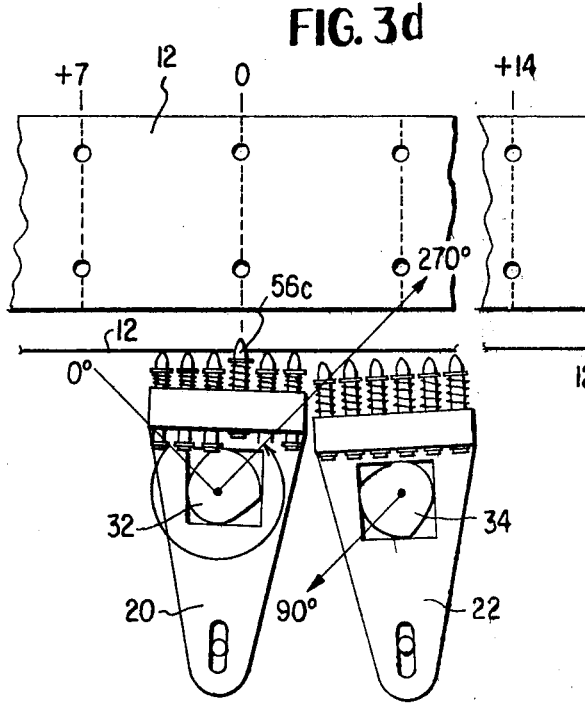
Figure 3E:
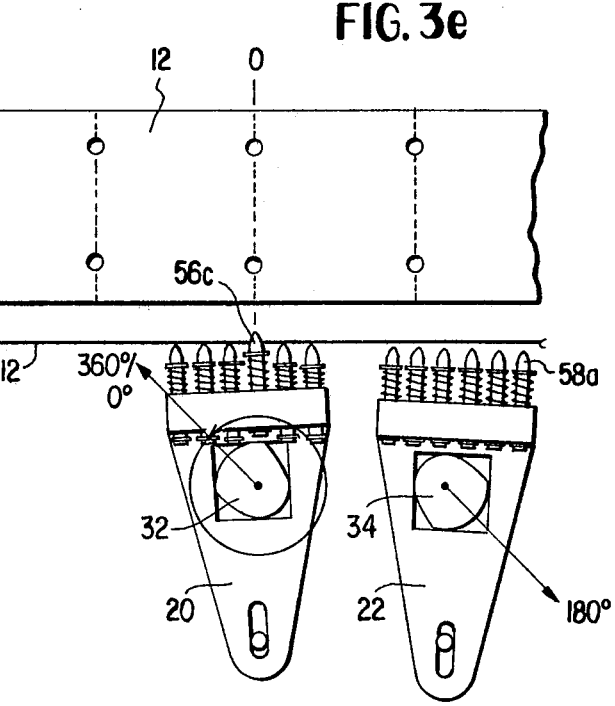

Referring generally to FIGS. 3a-3e, a typical sequence of operation is disclosed as the cams 32, 34 are rotated through 360 degrees. More specifically, FIG. 3a shows cam 32 at its 0 degree position and cam 34, 180 degrees out of phase therewith. In this position, the pin nose 58a is in engagement with a hole in the tag stock 12 also shown in its zero or starting position. As the cams 32, 34 are rotated through 90 degrees of arc to the position shown in FIG. 3b, the pin 56a is moved out of engagement with the tag stock 12 and the pin 58c is brought up into engagement with the next hole 18 upstream. As the cams 32, 34 are rotated an additional 90 degrees for a total thus far of 180 degrees, as shown in FIG. 3c, the pin 58c advances the tag stock 12 a predetermined distance in the direction of the arrow which by way of example, has been chosen to be 7 millimeters. As the cams 32, 34 are rotated an additional 90 degrees for a total thus far of 270 degrees as shown in FIG. 3d, the pin 58c is withdrawn from the drive hole and pin 56c is brought up into engagement with the next aligned drive hole. Further rotation of the cams 32, 34 an additional 90 degrees for a total of 360 degrees, the pin 56c advances the tag stock an additional 7 millimeters for a total of 14 millimeters for one complete revolution (360°) of the cams 32, 34. As the cams 32, 34 continue to rotate, various other combinations of pins 56, 58 will be utilized to advance the tag stock 12 depending on the distance (x) between the holes 18 of the particular stock. Throughout the entire sequence of operation as just described, it will be noted that a pin of one of the sets associated with a carrier arm is always in engagement with a hole in the tag stock. The tag stock is thus never permitted to "float".

The transport mechanism of the present invention as just described in detail could, of course, be used to advance or feed web materials having spaced-apart drive holes in devices other than stationary encoders. Therefore, the foregoing should be considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A mechanism for feeding tag stock perforated at varying predetermined lengths and having drive holes at said perforations, said mechanism comprising:
   (a) guide means for supporting said tag stock;
   (b) first and second spaced-apart carrier arms mounted for oscillatory swinging and reciprocating movement beneath said supported tag stock, each of said carrier arms having cam follower means thereon;
   (c) a set of spaced-apart pins, each slidably mounted in one end of each of said carrier arms, each of said pins in each of said sets being spring-urged away from said ends toward said tag stock; and
   (d) first and second cam means rotatably driven at the same speed and in the same direction in engagement with said cam follower of said first and second carrier arms respectively, whereby upon rotation of said first and second cam means each of said sets of pins is alternately brought into contact with said tag stock whereupon a pin in each of said sets will alternately engage a hole in registry therewith to sequentially advance said tag stock a desired increment of distance, there being a pin of one of said sets in driving engagement with a hole in said tag stock at all times.

2. A mechanism as set forth in claim 1 wherein said cams are positioned in opposite phase relationship to each other.

3. A mechanism as set forth in claim 2 wherein each of said cams are of constant diameter.

4. A mechanism as set forth in claim 1 wherein said first and second carrier arms are slidably mounted at one end about respective pivot points and the end of said pin of one of said carrier arms in engagement with said drive hole is twice the distance from said pivot point as the axis of rotation of said cam is from said pivot point of said carrier arm thereby enabling said end of said pin to travel twice the distance parallel to said tag stock as it does normal thereto.

5. A mechanism as set forth in claim 1 wherein each of said cams and said respective cam followers are so shaped that the end of each of said pins describe essentially a rectangular-shaped path as said cams are rotated through 360 degrees.

6. A mechanism as set forth in claim 1 wherein said guide means has slots therein to ensure the proper lateral movement of said pins relative to said tag stock.

7. A mechanism as set forth in claim 4 wherein the ends of said pins are bullet-shaped to permit ease of entry into said drive hole.

* * * * *